United States Patent [19]
Morishita et al.

[11] Patent Number: 5,674,150
[45] Date of Patent: Oct. 7, 1997

[54] CONTROL APPARATUS FOR TRANSMISSION

[75] Inventors: Naohisa Morishita, Fujimi; Toshiyuki Yumoto, Iruma, both of Japan

[73] Assignee: Honda Giken Kogyo Kabushiki Kaisha, Tokyo, Japan

[21] Appl. No.: 592,776

[22] Filed: Jan. 26, 1996

[30] Foreign Application Priority Data

Jan. 26, 1995 [JP] Japan .................................. 7-029951
Feb. 15, 1995 [JP] Japan .................................. 7-050499

[51] Int. Cl.$^6$ .......................................... F16H 9/00
[52] U.S. Cl. .......................... 477/39; 192/3.63
[58] Field of Search ................. 477/39, 79; 192/3.58, 192/3.63

[56] References Cited

U.S. PATENT DOCUMENTS

| | | | |
|---|---|---|---|
| 4,718,308 | 1/1988 | Haley | 477/39 |
| 4,903,551 | 2/1990 | Hiramatsu et al. | 74/869 |
| 5,007,512 | 4/1991 | Petzold | 192/3.63 |
| 5,014,839 | 5/1991 | Ohzono et al. | 192/3.63 |
| 5,062,050 | 10/1991 | Petzold et al. | 477/39 |
| 5,069,083 | 12/1991 | Hirano et al. | 477/39 |
| 5,069,086 | 12/1991 | Murano et al. | 477/39 |
| 5,088,352 | 2/1992 | Ishimaru | 74/867 |
| 5,170,868 | 12/1992 | Yamashita et al. | 477/39 |
| 5,179,874 | 1/1993 | Hunter | 74/733.1 |

FOREIGN PATENT DOCUMENTS

| | | |
|---|---|---|
| 0231058 | 8/1987 | European Pat. Off. . |
| 0412718 | 2/1991 | European Pat. Off. . |
| 0498210 | 8/1992 | European Pat. Off. . |
| 4243634 | 8/1992 | Japan . |

OTHER PUBLICATIONS (EPO) Partial European Search Report (Application No. EP 96 10 0996) Date of Completion 24 May 1996 Examiner Van Prooijen, T. (The Hague).
English language Abstract of JP 4-243634 Aug. 1992.

*Primary Examiner*—Dirk Wright
*Attorney, Agent, or Firm*—Lyon & Lyon LLP

[57] ABSTRACT

For a transmission having a forward drive train, a reverse drive train and a starting clutch, a control apparatus comprises a clutch control valve for setting a clutch control pressure to control the engagement of the starting clutch and a reverse inhibitor valve for opening and closing a line to a reverse drive actuator. When the clutch control pressure increases to a value above a predetermined value, the reverse inhibitor valve closes the line to the reverse drive actuator.

For a transmission having drive and driven cylinders for controlling the speed ratio set by variable width drive and driven pulleys and a starting clutch for controlling power transmission; a control apparatus comprises a controller for judging whether or not a vehicle is in a predetermined normal forward driving mode (a driving condition which does not require a speed change or a rapid speed change), a clutch control valve for setting a clutch control pressure to control the engagement of the starting clutch, and a high pressure control valve for setting a speed-ratio changing pressure which is supplied to the drive and driven cylinders. When the vehicle is judged by the controller as being in the predetermined normal forward driving mode, the high pressure control valve corresponding to the clutch control pressure sets the speed-ratio changing pressure to a pressure lower than the pressure set while the vehicle is not in the predetermined normal forward driving mode.

13 Claims, 6 Drawing Sheets

CONTROL APPARATUS FOR TRANSMISSION

FIELD OF THE INVENTION

The present invention relates generally to a control apparatus for a transmission, which is incorporated in vehicles, etc. and particularly to a control apparatus for a belt-type continuously variable transmission which has a starting clutch.

BACKGROUND OF THE INVENTION

Various types of transmission have been devised and incorporated into vehicles. For example, Japanese Patent Laid-open Publication No. 4-243634 proposes a belt-type continuously variable transmission which comprises drive and driven pulleys each having a variable pulley width, and a metallic V-belt trained therearound. The speed ratio of this transmission is variably controlled by adjusting the variable widths, to which the pitch diameters of the pulleys are variably proportional.

In such transmission, a neutral condition is often required so that power transmission is allowed to switch on or off. For this purpose, a hydraulic starting clutch (hereinafter referred to simply as "starting clutch") is provided in the mechanism for transmitting power from the input shaft to the output shaft of the transmission. This starting clutch, whose engaging force is being controlled, is capable of adjusting its torque-transmission capacity thereby regulating the ratio of torque transmission from the input member to the output member thereof. The torque-transmission capacity of the starting clutch is made smaller than the input torque while the vehicle is starting, thereby allowing some slippage in the clutch engagement so that the vehicle accelerates smoothly. On the other hand, the torque-transmission capacity is made larger than the input torque while the vehicle is running forward steadily, i.e., driving at a relatively constant speed, thereby eliminating slippage in the clutching engagement so that all torque input can be transmitted to the output member for efficiency.

In the transmission disclosed in the above mentioned publication, control of the engaging force of the starting clutch is carried out through a starting clutch control pressure generated by a clutch control valve (solenoid valve) in correspondence with the energizing current flowing through the solenoid thereof. The maximum pressure of this starting clutch control pressure is ordinarily set at a pressure which is required for setting the torque-transmission capacity so large as to allow the maximum allowable torque input to the input member of the starting clutch to be transmitted fully to the output member without any slippage.

Moreover, as automotive vehicles are required to be capable of reversing the drive directions forward or rearward, the above power transmission mechanism is provided with a forward drive train which transmits power from the input member to the output member in such a way that the output member rotates in a forward direction and a reverse drive train which transmits power in such a way that the output member rotates in the reverse direction. In the belt-type continuously variable transmission of the above disclosure, the forward and reverse drive trains are constructed with a planetary gear train, whose ring gear is fixedly held against rotation by a reverse drive actuator (reverse brake) when actuating the reverse drive train.

This reverse drive hydraulic actuator is supplied with an actuating pressure when a manual valve, which is shifted manually by the driver between the positions for forward drive and for reverse drive, is operated to the reverse drive position. As such, if the manual valve is mistakenly operated to the reverse drive position while the vehicle is driving forward, then smooth power transmission of the transmission will be interrupted or disturbed. In order to avoid such disturbance, for example, the system is arranged such that when the vehicle's forward speed increases to a predetermined value, the supply line of the actuating pressure to the reverse drive actuator becomes completely blocked even if the manual valve is operated into the reverse drive position. More specifically, when the vehicle reaches a certain speed, the hydraulic passage for supplying the actuating pressure to the reverse brake is blocked by the actuation of a solenoid valve provided as reverse inhibitor, whereby actuation of the reverse drive train is prevented while the vehicle is driving forward.

This method of the above disclosure requires a solenoid valve whose only purpose is to prevent actuation of the reverse drive train while driving forward. This solenoid valve provided as such presents a few problems of design complication. The hydraulic circuit of the transmission becomes complex, thus raising production cost. This added solenoid valve also requires additional electrical circuits not only to control the actuation of the solenoid valve but also to energize the solenoid, thus complicating the electrical circuits as well.

On the other hand, transmissions are often equipped with hydraulic speed-ratio changing means, and a speed-ratio changing pressure is supplied to this speed-ratio changing means for the purpose of adjusting the speed-ratio of the transmission. In the transmission of the above disclosure, a hydraulic cylinder (speed-ratio changing means) is provided in the axially movable member of each pulley so that controlled adjustment of the pulley widths is carried out by a pulley thrust pressure received in the cylinders for control of the speed ratio. Each cylinder selectively receives through a four-way valve a low pulley thrust control pressure or a high pulley thrust control pressure. The low pulley thrust control pressure is a minimal pressure required for power transmission without causing slippage between the belt and the pulleys. The high pulley thrust control pressure (hereinafter this is also referred to as "speed-ratio changing pressure"), which is set greater than the low pulley thrust control pressure, is used for shifting the speed ratio.

In this belt-type continuously variable transmission, one of the pulleys is supplied with the low pulley thrust control pressure and the other with a relatively high speed-ratio changing pressure while the vehicle is starting, requiring frequent changes in the speed ratio, or the vehicle is in kickdown, requiring rapid changing of the speed ratio. In these situations, the variable widths of the pulleys rapidly change, thereby changing the speed ratio rapidly. On the other hand, while the vehicle is driving forward at a relatively constant speed, requiring little shift in the speed ratio, one of the pulleys is supplied with a speed-ratio changing pressure which is a little higher than the low pulley thrust control pressure, which is supplied to the other, such that deviations occurring in the speed ratio due to changes of the torque transmitted through the belt are corrected for the purpose of maintaining a constant speed ratio.

While the vehicle is in normal forward driving mode without requiring a speed change or a rapid speed change, the above mentioned relatively high speed-ratio changing pressure is not required for the transmission. It is only necessary that the speed-ratio changing pressure be maintained at a pressure slightly higher than the low pulley thrust control pressure. In transmissions of the prior art, a relatively high speed-ratio changing pressure was generated even while the vehicle was in normal forward driving mode because design priority was given to rapid adjustment of the speed ratio required during the vehicle's startup or kickdown. This continuously generated relatively high speed-ratio changing pressure required a constant high discharge pressure from the hydraulic pump, thus presenting a problem of power loss in the operation of the pump.

It is desirable that the speed-ratio changing pressure be made as small as possible while the vehicle is in normal forward driving mode, whereby the discharge pressure required of the hydraulic pump be also set as small as possible. In this way, power loss can be reduced in the operation of the pump. As for methods of reducing the speed-ratio changing pressure while the vehicle is in normal forward driving mode, a solenoid valve can be provided, e.g., specifically for reducing the speed-ratio changing pressure, or the previously mentioned solenoid valve as reverse inhibitor may be utilized for this purpose.

However, these methods would complicate the circuit design of the transmission and present a problem of raising production cost. If a solenoid valve is added to the existing hydraulic circuit specifically for lowering the speed-ratio changing pressure or as reverse inhibitor, then design complication will involve not only the hydraulic circuit but also the electric circuit. A circuit for controlling the actuation of the solenoid valve as well as a circuit for energizing the solenoid must be added to the existing electric circuit.

SUMMARY OF THE INVENTION

It is an object of the present invention to provide a control apparatus which insures inactivation of a reverse drive actuator of a transmission, while a vehicle is driving forward, without having a solenoid valve for reverse inhibition.

It is another object of the present invention to provide a speed-ratio control apparatus which is capable of lowering the speed-ratio changing pressure while a vehicle is in a normal forward driving mode so as to minimize the operation loss of a hydraulic pump, without having a solenoid valve for this specific purpose.

In order to achieve these objects, the present invention embodies a control apparatus comprising clutch pressure control means for setting a clutch control pressure to control the engagement of a starting clutch and open/close switching means (reverse inhibitor) for opening and closing a line to a reverse drive actuator. Thereby, when the clutch control pressure increases to a pressure above a predetermined value, the open/close switching means closes the line to the reverse drive actuator.

In this control apparatus, the clutch control pressure, previously only used for engagement control of the starting clutch, is utilized for actuation of the open/close switching means. As a result, the control apparatus has a relatively simple hydraulic circuit design without including a solenoid valve for reverse inhibition, thus being cost effective. Moreover, the reverse drive train of the transmission is securely prevented from actuation by the control apparatus with the open/close switching means, which closes the line to the reverse drive actuator when the clutch control pressure increases to the pressure above a predetermined value while the vehicle's running forward.

The above mentioned predetermined value is preferably set above the clutch control pressure which is required for the starting clutch to transmit the maximum torque input, from the input member to the output member (hereinafter referred to as "maximum clutch torque control pressure"). Thereby, the torque transmission ratio of the starting clutch is fully controllable by variably setting the clutch control pressure to any pressure lower than the maximum clutch torque control pressure. If the clutch control pressure is set above the predetermined value, the supply of actuation pressure to the reverse actuator is securely blocked by the open/close switching means while the torque transmission ratio of the starting clutch is held at the maximum, capable of transmitting the input torque fully to the output member.

In other words, while in the prior art, the starting clutch and the reverse inhibitor were independently controlled through control of energizing currents flowing through the two solenoids: one for the clutch control valve and the other for the reverse inhibitor; in the present invention, the torque transmission ratio of the starting clutch and the actuation of the reverse inhibitor are controlled independently through control of only the energizing current of the solenoid which is used for the clutch control valve.

The invention may also be incorporated into a transmission for use in a vehicle, the transmission comprising a power transmission mechanism for transmitting power from an input shaft to an output shaft through speed-ratio changing means which varies the speed ratio of the output shaft to the input shaft, shift control means for controlling the speed ratio established by the speed-ratio changing means, and a starting clutch provided in the power transmission mechanism for controlling power transmission from the input shaft to the output shaft. In this transmission, a control apparatus comprises judging means which determines whether or not the vehicle is in a normal forward driving mode (eg., driving condition not requiring a speed change or a rapid speed change), clutch pressure control means for setting a clutch control pressure to control the engagement of the starting clutch, and shift pressure setting means for setting a speed-ratio changing pressure which is supplied to the shift control means. As such, when the vehicle is judged by the judging means as being in the predetermined normal forward driving mode, the shift pressure setting means corresponding to the clutch control pressure sets the speed-ratio changing pressure to a pressure lower than the pressure set while the vehicle is not in the predetermined normal forward driving mode.

The invention may further be incorporated into a belt-type continuously variable transmission comprising a variable width drive pulley connected to the input shaft of the transmission, a variable width driven pulley connected to the output shaft, a V-belt extended therearound, a drive cylinder for setting the pulley width of the variable width drive pulley and a driven cylinder for setting the pulley width of the variable width driven pulley, and a starting clutch for controlling power transmission provided in the power transmission mechanism linking the input shaft to the output shaft. In this transmission, a control apparatus of the present invention comprises judging means which determines whether the vehicle is in a normal forward driving mode or not, thrust pressure setting means for setting a low pulley thrust control pressure and a high pulley thrust control pressure higher than the low pulley thrust control pressure, supply switching means for selectively supplying the low and high pulley thrust control pressures into the drive and driven cylinders, and clutch pressure control means for setting a clutch control pressure so as to control the engagement of the starting clutch. When the vehicle is judged by the judging means as being in the predetermined normal forward driving mode, the thrust pressure setting means corresponding to the clutch control pressure sets the high pulley thrust control pressure to a pressure lower than the pressure set at while the vehicle is not in the predetermined normal forward driving mode.

As described above, in the control apparatus of the present invention, the shift pressure setting means (thrust pressure setting means) corresponding to the clutch control pressure, which controls the engagement of the starting clutch, lowers the shift control pressure (high pulley thrust control pressure) when the vehicle is in the normal forward driving mode. As such, it is not necessary for the control apparatus to be provided with a solenoid valve whose specific use is for lowering the pressure generated by the shift pressure setting means while the vehicle is in the normal forward driving mode. As a result, the design of the control apparatus is relatively simple, so the control apparatus can be produced at a comparatively low cost.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention and wherein.

DESCRIPTION OF THE PREFERRED EMBODIMENTS

Figure 1:
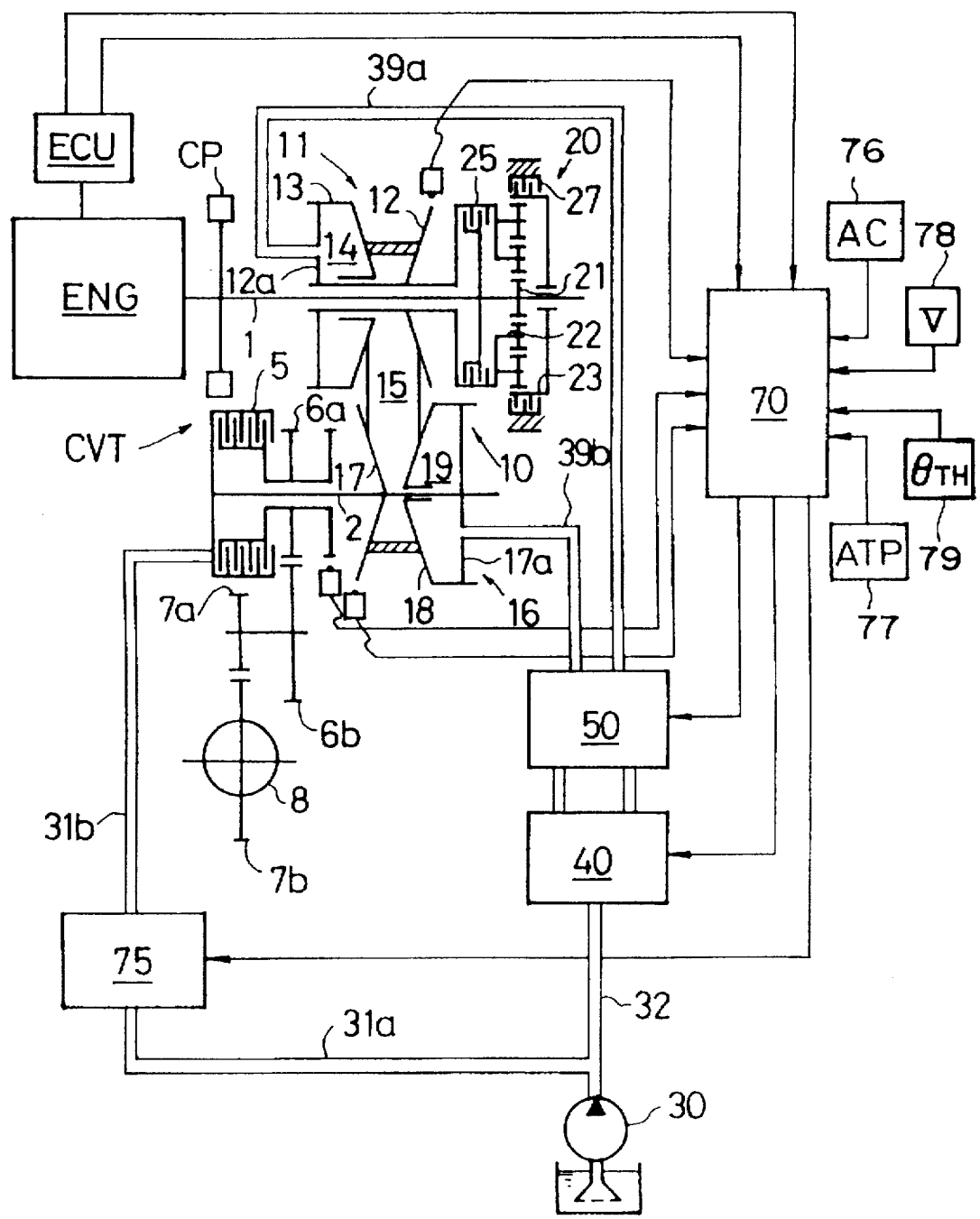
FIG. 1 is a schematic view showing the construction of a V-belt-type continuously variable transmission having a control apparatus of the present invention.

A belt-type continuously variable transmission CVT having a control apparatus according to the present invention is schematically shown in FIG. 1. This belt-type continuously variable transmission CVT comprises a metallic V-belt mechanism 10 disposed between an input shaft 1 and a countershaft 2, a planetary-gear forward-reverse selector mechanism 20 disposed between the input shaft 1 and the drive pulley 11 of the metallic V-belt mechanism 10, and a starting clutch 5 disposed between the countershaft 2 and a differential mechanism 8 as the output member. The transmission CVT is suitable for use as a motor vehicle transmission. The input shaft 1 is connected with the output shaft of an engine ENG through a coupling mechanism CP. The power transmitted to the differential mechanism 8 drives the right and left wheels (not shown).

The metallic V-belt mechanism 10 comprises a drive pulley 11 mounted on the input shaft 1, the driven pulley 16 mounted on the countershaft 2, and a metallic V-belt 15 trained around the drive and driven pulleys 11 and 16.

The drive pulley 11 comprises an axially fixed pulley member 12 rotatably mounted on the input shaft 1, and a movable pulley member 13 axially slidable with respect to the fixed pulley member 12. The movable pulley member 13 has a cylinder chamber 14 defined axially laterally therein by a cylinder wall 12a coupled to the axially fixed pulley member 12. A hydraulic pressure, i.e., a pulley thrust pressure, supplied into the cylinder chamber 14 through a hydraulic passage 39a generates a lateral thrust force for sliding the movable pulley member 13 axially toward the fixed pulley member 12.

The driven pulley 16 comprises a fixed pulley member 17 fixedly mounted on the countershaft 2, and a movable pulley member 18 axially slidable with respect to the fixed pulley member 17. The movable pulley member 18 has a cylinder chamber 19 defined axially laterally therein by a cylinder wall 17a coupled to the fixed pulley member 17. A hydraulic pressure, i.e., a pulley thrust pressure, supplied into the cylinder chamber 19 through a hydraulic passage 39b generates a lateral thrust force for sliding the movable pulley member 18 axially toward the fixed pulley member 17.

Supply control of the pulley thrust pressures into the cylinder chambers 14 and 19 makes possible the control of the thrust forces for adjusting the variable widths of the pulleys 11 and 16 while avoiding slippage of the V-belt 15. These controllably adjustable widths, controlling the pitch diameters of the pulleys 11 and 16, allows for the mechanism 10 to continuously vary the speed ratio of the transmission.

The planetary-gear forward-reverse selector mechanism 20 comprises a sun gear 21 coaxially coupled to the input shaft 1, a carrier 22 coupled to the axially fixed pulley member 12, a ring gear 23 which can be held against rotation by a reverse brake (a hydraulic actuator for reversing the drive) 27, and a forward clutch 25 capable of holding the sun gear 21 and the ring gear 23 together in rotation. When the forward clutch 25 is engaged, the sun gear 21, the planet gears on the carrier 22, and the ring gear 23 rotate in unison with the input shaft 1. As a result, the drive pulley 11 rotates in the same direction, i.e., forward direction, as the input shaft 1, thereby establishing the power transmission for forward drive. When the reverse brake 27 is engaged, the ring gear 23 is held against rotation. As a result, the carrier 22 is rotated in the direction opposite to that of the sun gear 21, and the drive pulley 11 coupled with the carrier 22 rotates in the direction opposite to that of the input shaft 1, i.e., reverse direction, thereby establishing the power transmission for reverse drive.

The starting clutch 5 controls transmission of power from the countershaft 2 to the output member. When the starting clutch 5 is engaged and the engaging force thereof is controlled, the size of the torque transmitted from the countershaft 2 to the output member is controlled. When the starting clutch 5 is engaged, power from the engine ENG is transmitted from the countershaft 2 through meshing gears 6a, 6b, 7a and 7b to the differential mechanism 8 at a speed ratio determined by the metallic V-belt mechanism 10. It is then divided and transmitted to the right and left wheels (not shown in the figure). When the starting clutch 5 is disengaged, the torque transmission is zero. When the transmission is in this neutral condition, power from the engine is not transmitted at all. The operation of the starting clutch 5 is manipulated by a clutch control valve 75 in response to control signals sent from a controller 70. The clutch control valve 75 regulates the hydraulic pressure (starting clutch control pressure Psc) supplied to the starting clutch 5 through passages 31a and 31b and thereby controls the operation thereof. The construction of the clutch control valve 75 will be described in detail later.

The controller (judging means) 70 receives electric signals corresponding to the engine rotational speed Ne and the engine intake vacuum pressure PB from the engine control unit ECU which controls the operation of the engine ENG. In addition to these signals, it also receives a detection signal from the air-conditioner sensor 76 which detects whether the air-conditioner AC is operating or not, and a shift-range position signal from the shift-range detector 77 which detects the shift-range, based on the position of the shift lever ATP. In responding to these signals, the controller 70 controls the above mentioned starting clutch 5 and a pulley thrust pressure valve unit 40 and a shift control valve unit 50, which will be described in the following.

In addition, the controller 70 receives detection signals from the speed sensor 78 which detects the speed of the vehicle and the throttle sensor 79 which detects the degree of engine intake air throttling. Based on these detection signals from the speed sensor 78 and the throttle sensor 79, the controller 70 determines the vehicle's driving condition.

Figure 2:
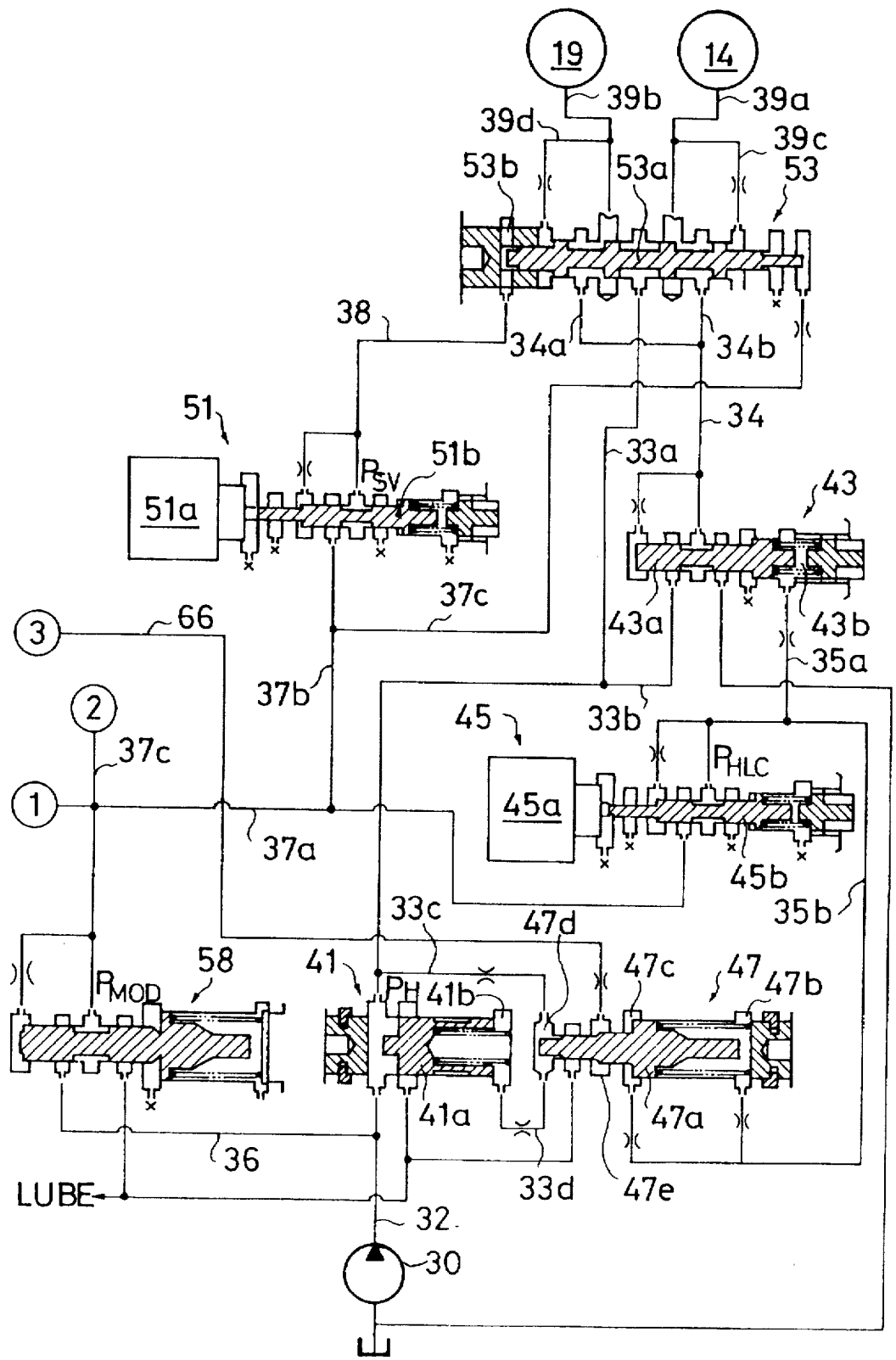
FIG. 2 is a hydraulic circuit diagram of a portion of the control apparatus.

The pulley thrust pressures supplied into the drive and driven cylinder chambers 14 and 19 are controlled by the pulley thrust pressure valve unit 40 and the shift control valve unit 50 in response to control signals received from the controller 70. As shown in FIG. 2, the pulley thrust pressure valve unit 40 comprises a high pressure regulator valve 41, a low pressure regulator valve 43, a high/low pressure control valve 45, and a high pressure control valve 47. The shift control valve unit 50 comprises a shift control valve 51 and a shift valve 53. The constructions of these valves will be described in detail in the following description of the control apparatus.

Figure 3:
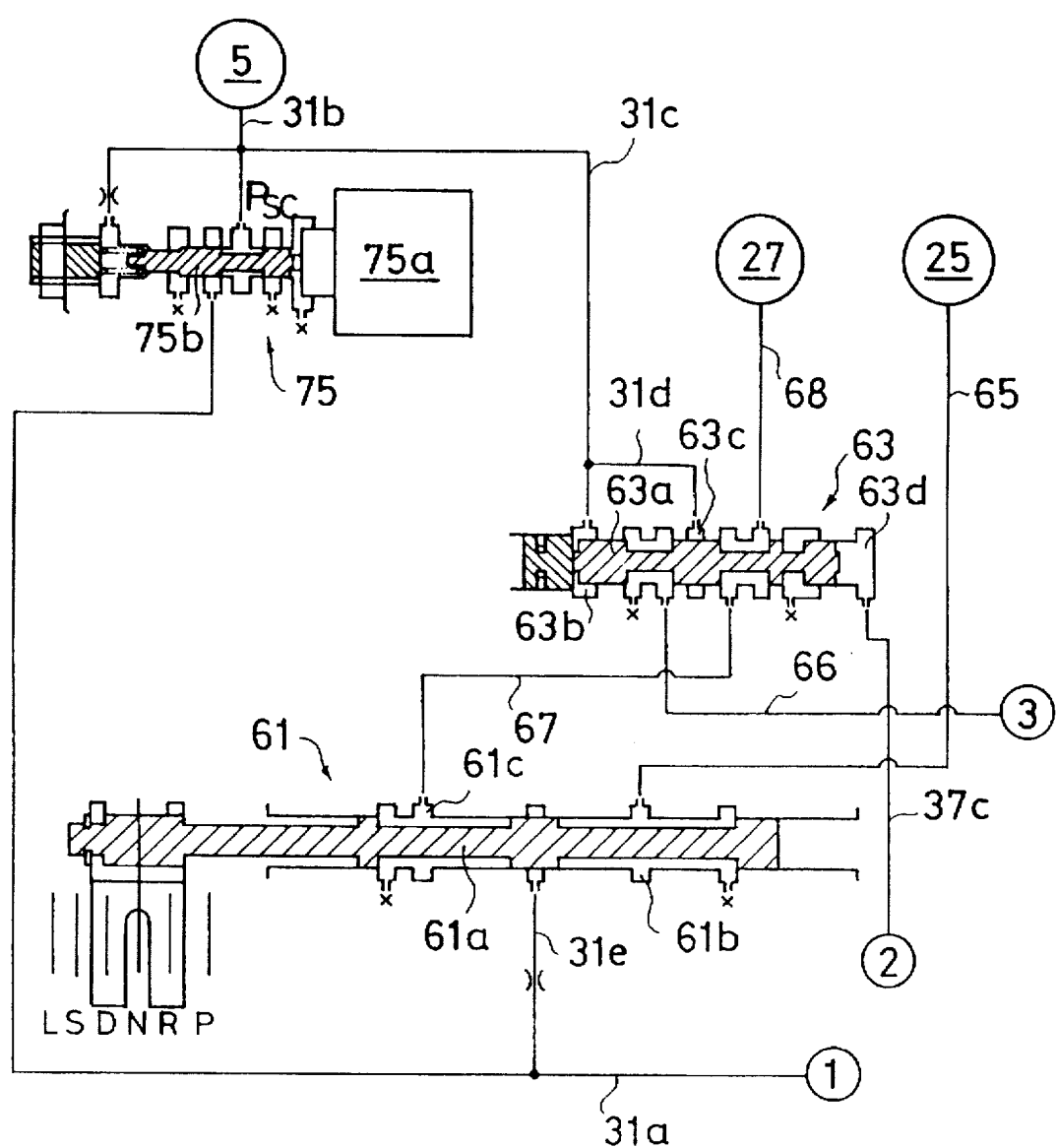
FIG. 3 is a hydraulic circuit diagram of a portion of the control apparatus.

The hydraulic circuit arrangements shown in FIGS. 2 and 3 integrally make up a single hydraulic circuit when the ends of passages marked (1), (2), and (3) in FIGS. 2 and 3 are interconnected. The mark "X" in the figures indicates a connection point to the drainage of the circuit.

Oil from a hydraulic pump 30 is supplied through a hydraulic passage 32 to the above mentioned high pressure regulator valve 41. It is also supplied through a hydraulic passage 36 to a reducing valve 58 to generate a line pressure PMOD, which has a substantially constant pressure. The line pressure PMOD is then supplied to the above mentioned high/low pressure control valve 45, shift control valve 51, clutch control valve 75, and a manual valve 61 through passages 37a, 37b, 31a, and 31e.

The high/low pressure control valve 45 includes a linear solenoid 45a. Control of the energizing current to the linear solenoid 45a enables control of the biasing force applied on the spool 45b. In correspondence with the biasing force applied on the spool, the high/low pressure control valve 45 converts or adjusts the line pressure PMOD supplied through the passage 37a to a control back-pressure PHLC. The control back-pressure PHLC produced is then supplied through a passage 35a into the right-end chamber 43b of the low pressure regulator valve 43, thereby pushing the spool 43a thereof to the left. The control back-pressure PHLC is also supplied through a passage 35b into the right-end chamber 47b of the high pressure control valve 47 and the first halfway chamber 47c next from the right end. The control back-pressure PHLC in the right-end chamber 47b pushes the spool 47a to the left, and the control back-pressure PHLC in the first halfway chamber 47c pushes the spool 47a to the right.

The high pressure regulator valve 41 converts or adjusts the pressure of oil supplied through the passage 32 from the pump 30, to a high pulley thrust control pressure PH. The high pulley thrust control pressure PH generated here is then supplied to the shift valve 53 through a passage 33a and also to the low pressure regulator valve 43 through a passage 33b. Furthermore, the high pulley thrust control pressure PH is supplied to a passage 33c which branches from the passage 33a and connects to the left-end chamber 47d of the high pressure control valve 47.

The second halfway chamber 47e of the high pressure control valve (shift pressure setting means) 47 is connected through a passage 66 to a reverse inhibitor valve 63. As such, the spool 47a of the high pressure control valve 47 is positionally controlled by the control back-pressure PHLC received in the right-end chamber 47b and first halfway chamber 47c through the passage 35b and a second starting clutch control pressure PSC2, which will be described later, received in the second halfway chamber 47e through the passage 66. This positional control of the spool 47a enables the high pressure control valve 47 to adjust the high pulley thrust control pressure PH received through the passage 33c to a pressure which is supplied into the right-end chamber 41b of the high pressure regulator valve 41 as back pressure.

The low pressure regulator valve 43 converts or adjusts the high pulley thrust control pressure PH supplied through the passage 33b to a low pulley thrust control pressure PL in correspondence with the control back-pressure PHLC. The low pulley thrust control pressure PL is then supplied to the shift valve 53 through a passage 34 and passages 34a and 34b, which are branched from the passage 34.

Figure 5:
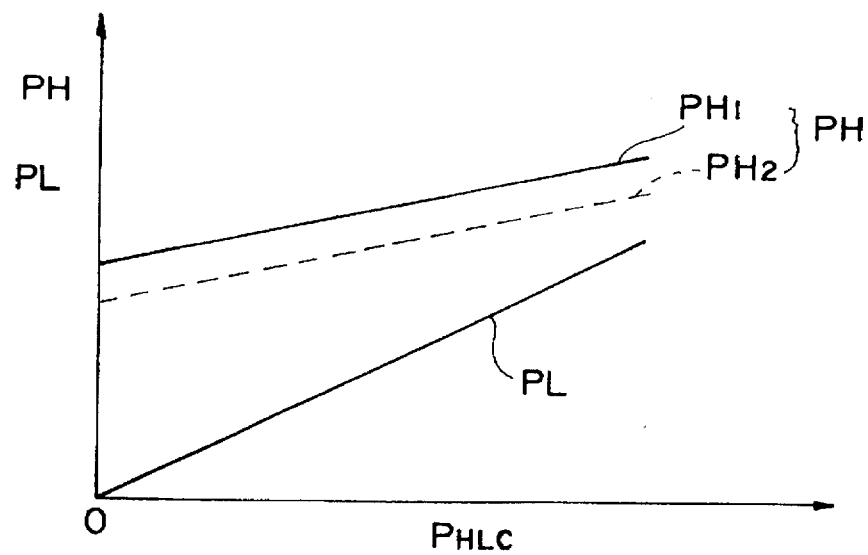
FIG. 5 is a graph showing high and low pulley thrust control pressures set by the control apparatus.

FIG. 5 shows relationship between the control back-pressure PHLC, which is produced by the high/low pressure control valve 45, and the high and low pulley thrust control pressures PH and PL, which are set by the high pressure regulator valve 41, high pressure control valve 47, and low pressure regulator valve 43. The high pulley thrust control pressure PH is switched between two pressures PH1 and PH2 in correspondence with the judgment determined by the controller 70 on the driving condition of the vehicle. How this switching is carried out will be discussed later. The first pulley thrust control pressure PH1 shown by the solid line in the graph is selected while the vehicle is judged by the controller 70 as starting up, requiring control of the speed ratio, or as in kickdown, requiring rapid change of the speed ratio. The second pulley thrust control pressure PH2 (<PH1) shown by the dotted line is selected while the vehicle is judge as in normal forward driving mode, requiring little control of the speed ratio (while only in forward drive as explained later). The low pulley thrust control pressure PL is a minimum pressure, when applied to the pulleys, which keeps the belt running without any slippage.

The shift control valve 51 includes a linear solenoid 51a. Control of the energizing current through the linear solenoid 51a makes the biasing force applied to the spool 51b controllable. As such, the line pressure PMOD supplied through the passage 37b to the shift control valve 51 is adjusted to a shift control pressure Psv in correspondence with the biasing force. Then, the shift control pressure Psv is supplied into the left-end chamber 53b of the shift valve 53 through a passage 38, thereby pushing the spool 53a thereof to the right.

Figure 4:
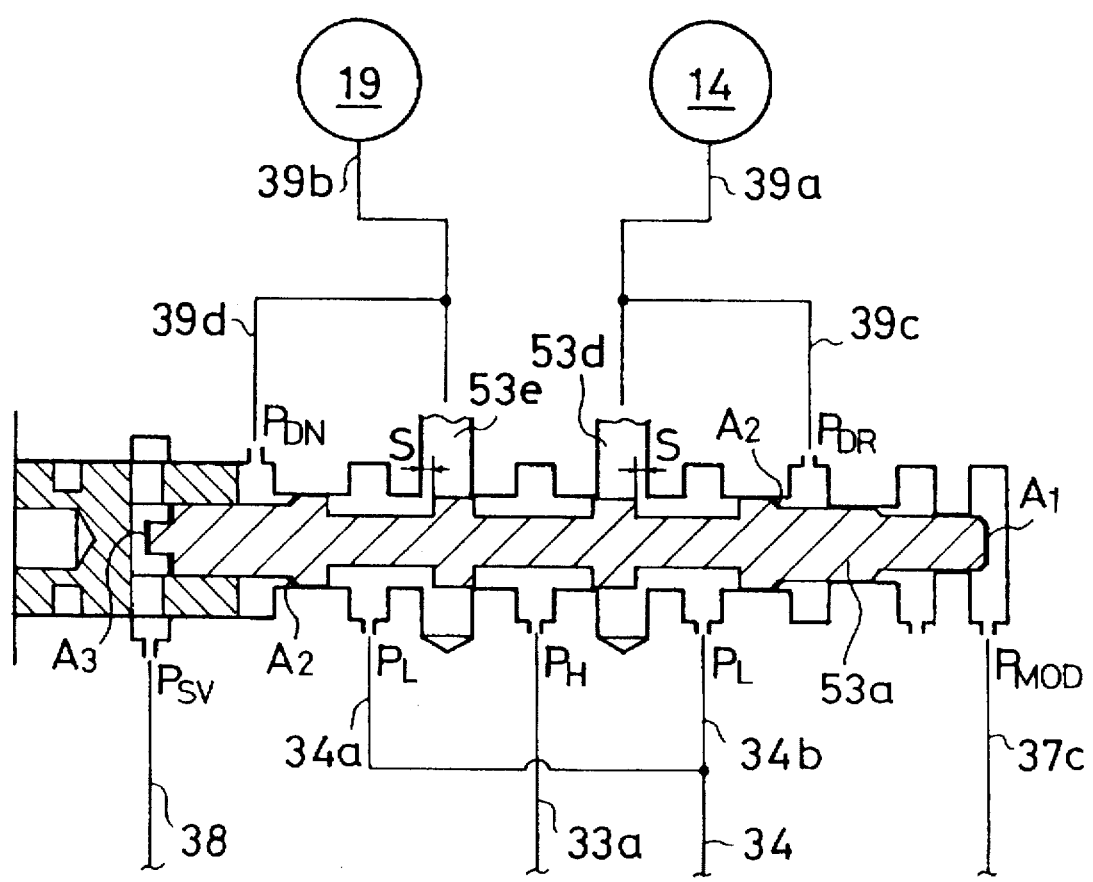
FIG. 4 is an enlarged view of a shift valve used in the control apparatus.

The shift valve 53 controls the delivery of the high and low pulley thrust control pressures PH and PL selectively into the drive and driven cylinder chambers 14 and 19 through the passages 39a and 39b, corresponding to the position of the spool 53a. As shown in FIG. 4, the left end surface (pressure-receiving area A3) of the spool 53a receives the shift control pressure PSV, which works to push the spool 53a to the right. On the other hand, the right end surface (pressure-receiving area A1) of the spool 53a receives the line pressure PMOD supplied through the passage 37c, which is branched from the passage 37b, whereby the spool 53a is pushed to the left. Furthermore, the right-side mediate surface (pressure-receiving area A2) of the spool 53a receives the inside pressure of the drive cylinder chamber 14, i.e. drive pulley thrust pressure PDR, through a drive pressure feedback passage 39c, which is branched from the passage 39a, whereby the spool 53a is pushed to the left. Moreover, the left-side mediate surface (pressure-receiving area A2) of the spool 53a receives the inside pressure of the driven cylinder chamber 19, i.e. driven pulley thrust pressure PDN, through a driven pressure feedback passage 39d, which is branched from the passage 39b, whereby the spool 53a is pushed to the right. As a result, the spool 53a is shifted to the position where the force pushing the spool 53a to the left, i.e., $P_{MOD} \times A1 + P_{DR} \times A2$, balances with the force pushing it to the right, i.e., $P_{SV} \times A3 + P_{DN} \times A2$.

Here, an equation is given to describe the condition where both forces are balanced.

$$P_{MOD} \times A1 + P_{DR} \times A2 = P_{SV} \times A3 + P_{DN} \times A2 \quad (1)$$

Being modified, $$P_{MOD} \times A1 + (P_{DR} - P_{DN}) \times A2 = P_{SV} \times A3 \quad (2)$$

Figure 6:
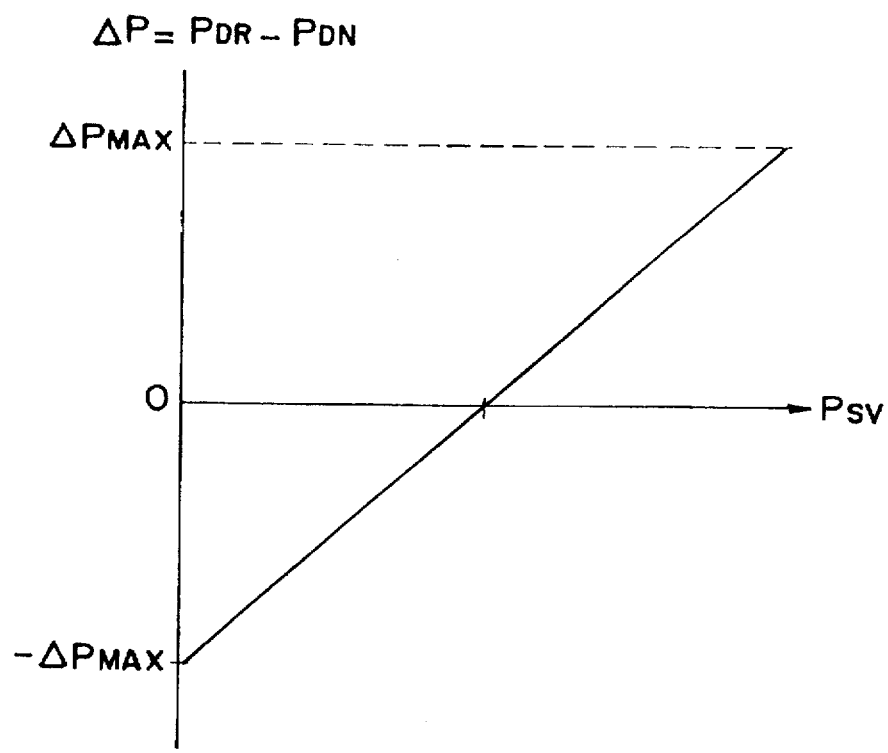
FIG. 6 is a graph showing the pressure difference between the pressures discharged by the shift valve.

As seen from the equation (2) and FIG. 6, the difference between the drive pulley thrust pressure PDR and driven pulley thrust pressure PDN, i.e., $\Delta P = P_{DR} - P_{DN}$, is proportional to the shift control pressure PSV. Therefore, if either of the drive pulley thrust pressure PDR or the driven pulley thrust pressure PDN is set at the low pulley thrust control pressure PL, then the other can be set at a pressure which is the low pulley thrust control pressure PL plus a pressure increased proportionally to the shift control pressure PSV.

The clutch control valve (clutch pressure control means) 75 has a linear solenoid 75a. Control of the energizing current to the linear solenoid 75a enables control of the biasing force working on the spool 75b. In correspondence with the biasing force so controlled, the line pressure PMOD supplied through the passage 31a is adjusted to generate the previously mentioned starting clutch control pressure PSC, which is discharged to the passage 31b and to a hydraulic passage 31c, which is branched from the passage 31b. The passage 31b is connected to the starting clutch 5, and the starting clutch control pressure PSC adjusts the engagement of the starting clutch 5. The passages 31c and 31d lead the starting clutch control pressure PSC into the left-end chamber 63b and the first halfway chamber 63c of the reverse inhibitor valve 63, respectively.

Figure 7:
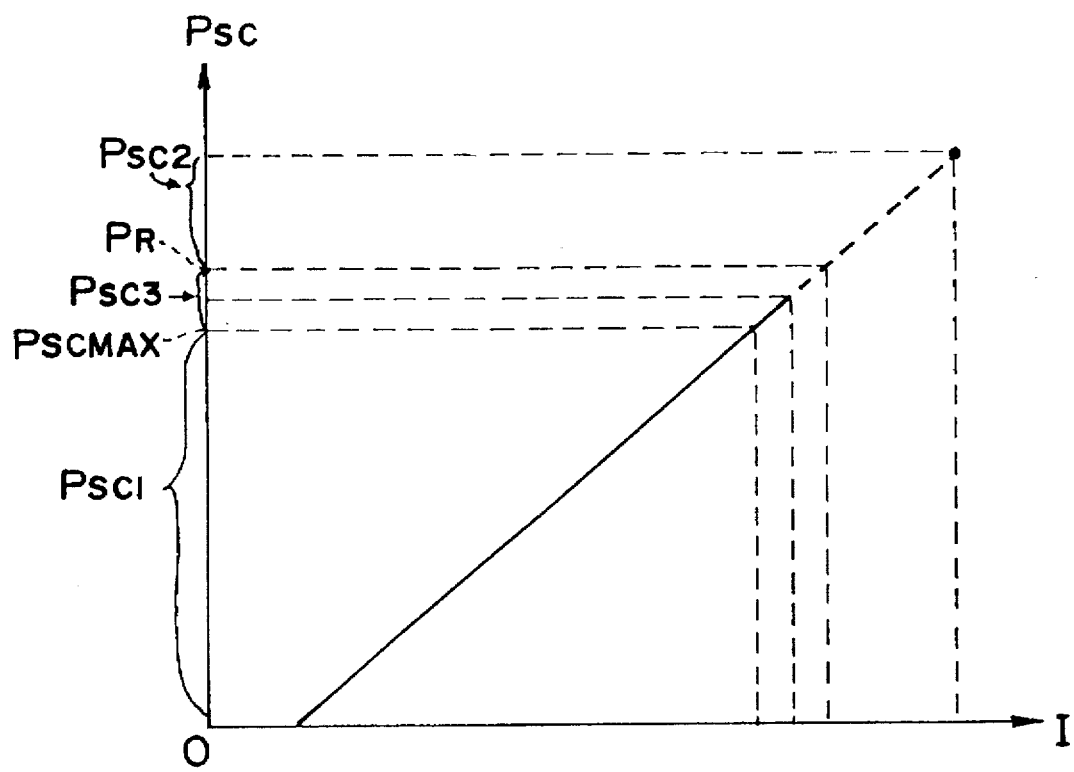
FIG. 7 is a graph showing starting clutch control pressures generated by the clutch control valve used in the control apparatus.

Now, as shown in FIG. 7, the starting clutch control pressure PSC generated by the clutch control valve 75 is proportional to the energizing current I provided to the linear solenoid 75a from the controller 70. For the purpose of applying the starting clutch control pressure PSC as a signal to initiate different functions in the system, a categorization is made so as to assign three pressure ranges to the starting clutch control pressure PSC: a first starting clutch control pressure PSC1 which ranges from zero to a maximum clutch torque control pressure PSC MAX for controlling the torque transmission ratio of the starting clutch 5; a second starting clutch control pressure PSC2 which occupies the range greater than an actuation-initiating pressure PR (>PSCMAX) which is greater than the maximum clutch torque control pressure PSCMAX and initiates the actuation of the reverse inhibitor valve 63; and a third starting clutch control pressure PSC3 which occupies the range greater than PSCMAX but smaller than the actuation-initiating pressure PR. The first starting clutch control pressure PSC1 is used for controlling the engagement of the starting clutch 5, and the torque transmission ratio of the starting clutch 5 in engagement is controlled in correspondence with the magnitude of the first starting clutch control pressure PSC1. The torque transmission ratio of the starting clutch 5 is set such that when the starting clutch 5 receives the first starting clutch control pressure PSC1 equal to the maximum clutch torque control pressure PSCMAX, a maximum torque input on the input side is transmitted fully onto the output side without slippage in clutch engagement.

The second starting clutch control pressure PSC2 is used for fixing the torque transmission ratio of the starting clutch 5 at the maximum and for controlling the actuation of the reverse inhibitor valve 63. The third starting clutch control pressure PSC3 is used only for fixing the torque transmission ratio of the starting clutch 5 at the maximum. As such, the first starting clutch control pressure PSC1 is applied while the condition of the vehicle is judged by the controller 70 as in starting mode (including forward start and reverse) or in a kickdown mode. The second starting clutch control pressure PSC2 is applied while the condition of the vehicle is judged as in a normal forward driving mode, and the third starting clutch control pressure PSC3 is applied while the vehicle is judged as in a normal reverse driving mode.

The manual valve 61 is connected to a shift lever provided at the driver's seat (not shown) with a cable. When the shift lever is operated manually by the driver to one of the six positions P, R, N, D, S, and L, the spool 61a of the manual valve 61 is shifted correspondingly to one of the positions indicated in FIG. 3, which is showing the spool 61a at the N (neutral) position. The first halfway chamber 61b provided in the right portion of the manual valve 61 is connected to the forward clutch 25 through a passage 65, and the second halfway camber 61c provided in the left portion is connected to the reverse inhibitor valve 63 through a passage 67. This passage 67 is connected through the reverse inhibitor valve 63 to a passage 68 which is connected to the reverse brake 27.

When the spool 61a of the manual valve 61 is at the P or N position, the passages 65 and 67 are connected to the drain. As a result, both forward clutch 25 and reverse brake 27 are not actuated for engagement. When the spool 61a is at the D, S, or L position, the passage 67 is connected to the drain, and the passage 31e having the line pressure PMOD is connected with the passage 65. As a result, the reverse brake 27 is not actuated, but the forward clutch 25 is actuated for engagement. Furthermore, when the spool 61a is at the R position, the passage 65 is connected to the drain, and the passage 31e having the line pressure PMOD is connected with the passage 67. As a result, the forward clutch 25 is not actuated for engagement, but the reverse brake 27 is actuated either for engagement or disengagement in relation with the operation of the reverse inhibitor valve 63, which will be described next.

The line pressure PMOD is supplied into the right-end chamber 63d of the reverse inhibitor valve (open/close switching means) 63 through the passage 37c to push the spool 63a to the left. When the first starting clutch control pressure Psc1 or third starting clutch control pressure Psc3 is supplied into the left-end chamber 63b of the reverse inhibitor valve 63 (i.e., the vehicle is in start up, kickdown, or normal reverse), the spool 63a is positioned at the left stroke end, and the passages 67 and 68 are connected to each other. Therefore, when the spool 61a of the manual valve 61 is at the R position, i.e., the passages 31e and 67 are connected with each other, the reverse brake 27 is actuated for engagement. Furthermore, when the spool 63a of the reverse inhibitor valve 63 is positioned at the left stoke end, the passage 66 connecting the reverse inhibitor valve 63 to the second halfway chamber 47e of the high pressure control valve 47 is connected to the drain.

On the other hand, when the second starting clutch control pressure Psc2 is supplied into the left-end chamber 63b of the reverse inhibitor valve 63 (i.e., the vehicle is in normal forward driving mode), the spool 63a is positioned at the right stroke end. As a result, fluid communication of the passages 67 and 68 is blocked, and the passage 68 is connected to the drain. In this condition, even if the spool 61a of the manual valve 61 is mistakenly shifted to the "R" position, the reverse brake 27 will not actuate for engagement, thereby preventing switching the transmission to the reverse drive train while the vehicle is in normal forward driving mode.

Moreover, when the spool 63a is at the right stroke end, the passages 66 and 31d are connected with each other, and the second starting clutch control pressure Psc2 is supplied into the second halfway chamber 47e of the high pressure control valve 47. As a result, the thrust working on the spool 47a rightward is increased, thereby, in turn, reducing the back pressure supplied into the right-end chamber 41b of the high pressure regulator valve 41. As a result, the high pulley thrust control pressure PH generated by the high pressure regulator valve 41 is switched from the first high pulley thrust control pressure PH1, which is generated to meet the need of frequent speed-ratio adjustment while the vehicle is starting, to the second high pulley thrust control pressure PH2, which is generated at a pressure substantially smaller than the first high pulley thrust control pressure PH1, only to satisfy the need of less frequent speed-ratio adjustment while the vehicle is in normal forward driving mode. As a result, the load of the oil pump 30 is reduced corresponding to this pressure reduction, whereby the fuel efficiency is improved as the engine runs with less of a load.

With the control system, which is constructed as described above, the vehicle is capable of driving while the starting clutch 5 and the forward clutch 25 or the reverse brake 27 are engaged. In addition, with the spool 53a of the shift valve 53 positionally controlled through control of the shift control pressure Psv, the pressures supplied into the cylinder chambers 14 and 19 are controlled so as to control the speed ratio of the transmission.

In the above embodiment, the clutch control pressure (second starting clutch control pressure Psc2) is utilized as pressure for reducing the high pulley thrust control pressure. However, the pressure to be used for making a reduction in the high pulley trust control pressure is not limited to the clutch control pressure in the control apparatus of the present invention. For example, the line pressure PMOD may be applied instead.

Also, in the above embodiment, the reverse inhibitor valve 63 is actuated by the second starting clutch control pressure Psc2, which is generated by the clutch control valve 75, while the vehicle is in normal forward driving mode, without any consideration of the vehicle's speed. Instead, the clutch control valve 75 may be controlled to generate the second starting clutch control pressure Psc2, for example, only when the speed of the vehicle, which is detected by the speed sensor 78, is above a predetermined value.

Furthermore, in the above embodiment, the control apparatus of the present invention is described as applied to a belt-type continuously variable transmission. However, it can be applied to other transmissions as well.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A control apparatus for a transmission having speed-ratio changing means, a shift control actuator for controlling the actuation of said speed-ratio changing means, and a starting clutch for controlling power transmission through said transmission; said shift control actuator and said starting clutch each being actuated by a supply of a hydraulic pressure;

wherein the pressure which actuates said starting clutch is also applied for actuation control of said shift control actuator when said pressure is above a predetermined value which is higher than a pressure required for a power-transmission control carried out by said starting clutch, and said predetermined value being set above a clutch control pressure required for said starting clutch to transmit a maximum torque through the transmission.

2. The control apparatus as set forth in claim 1 further including:

a power transmission mechanism having a forward drive train and a reverse drive train provided in parallel; said forward drive train transmitting power from an input shaft to an output shaft of said transmission such that said output shaft rotates in a forward direction, and said reverse drive train transmitting power from said input shaft to said output shaft such that said output shaft rotates in a reverse direction;

said starting clutch being is provided in said power transmission mechanism and controlling power transmission from said input shaft to said output shaft;

a reverse drive actuator for allowing the power transmission through said reverse drive train, said reverse drive actuator being actuated by a supply of a hydraulic pressure;

clutch pressure control means for setting a clutch control pressure to control the engagement of said starling clutch; and open/close switching means for opening and closing a line through which the pressure actuating said reverse drive actuator is supplied;

wherein when said clutch control pressure is equal to or higher than said predetermined value, said open/close switching means closes said line supplying the pressure to said reverse drive actuator.

3. The control apparatus as set forth in claim 2 further including:

a forward drive actuator for allowing the power transmission through said forward drive train, said forward drive actuator being actuated by a supply of a hydraulic pressure; and a manual valve which is operated in correspondence with the operation of a shift lever manipulated by a driver;

wherein when said manual valve is operated for forward drive, a pressure is supplied to said forward drive actuator through said manual valve; and wherein when said manual valve is operated for reverse drive, a pressure is supplied to said reverse drive actuator through said manual valve and open/close switching means, respectively.

4. The control apparatus as set forth in claim 3 wherein:

said open/close switching means comprises an open/close switching valve which is actuated by said clutch control pressure; and said open/close switching valve closes said line supplying the pressure to said reverse drive actuator when said clutch control pressure rises above the pressure required for said starting clutch to transmit a maximum torque from the input shaft.

5. The control apparatus as set forth in claim 4 wherein:

said clutch pressure control means sets said clutch control pressure at a pressure above the pressure required for said starting clutch to transmit the maximum torque from the input shaft only when said manual valve is positioned for forward drive; and wherein said line supplying the pressure to said reverse drive actuator is kept blocked even when said shift lever is operated for reverse drive during the vehicle's running forward.

6. A control apparatus for a transmission having speed-ratio changing means, a shift control actuator for controlling the actuation of said speed-ratio changing means, and a starting clutch for controlling power transmission through said transmission; said shift control actuator and said starting clutch each being actuated by a supply of a hydraulic pressure; further including;

a power transmission mechanism which transmits power from an input shaft to an output shaft thereof;

shift control means for controlling said speed-ratio changing means, said shift control means being actuated by a supply of a hydraulic pressure;

a starting clutch which controls power transmission from said input shaft to said output shaft;

judging means which determines whether the vehicle is in a normal forward driving mode or not;

clutch pressure control means for setting a clutch control pressure to control the engagement of said starting clutch; and shift pressure setting means for setting a speed-ratio changing pressure which is supplied to said shift control means;

wherein the pressure which actuates said starting clutch is also applied for actuation control of said shift control actuator when said pressure is above a predetermined value which is higher than a pressure required for a power-transmission control carried out by said starting clutch; and wherein when the vehicle is judged by said judging means as being in the normal forward driving mode, said shift pressure setting means corresponding to said clutch control pressure sets said speed-ratio changing pressure to a pressure lower than the pressure set while the vehicle is not in the normal forward driving mode.

7. The control apparatus as set forth in claim 6 wherein:

said power transmission mechanism has a forward drive train and a reverse drive train provided in parallel; said forward drive train transmitting power from said input shaft to said output shaft such that said output shaft rotates in a forward direction, and said reverse drive train transmitting power from said input shaft to said output shaft such that said output shaft rotates in the reverse direction; and further including:

a reverse drive actuator for allowing the power transmission through said reverse drive train, said reverse drive actuator being actuated by a supply of a hydraulic pressure; and open/close switching means for opening and closing a line through which the pressure actuating said reverse drive actuator is supplied;

wherein when said clutch control pressure is equal to or higher than said predetermined value, said open/close switching means closes said line supplying the pressure to said reverse drive actuator and supplies a lowering pressure for lowering said speed-ratio changing pressure to said shift pressure setting means.

8. The control apparatus as set forth in claim 6 wherein:

said speed-ratio changing means includes a belt-type continuously variable transmission comprising a variable width drive pulley connected to said input shaft, a variable width driven pulley connected to said output shaft, and a V-belt extended around said drive pulley and said driven pulley;

said shift control means comprises a drive cylinder for setting a pulley thrust force in said variable width drive pulley and a driven cylinder for setting a pulley thrust force in said variable width driven pulley; and further including:

thrust pressure setting means for setting a low pulley thrust control pressure and a high pulley thrust control pressure higher than said low pulley thrust control pressure; and supply switching means for selectively supplying said low and high pulley thrust control pressures into said drive and driven cylinders;

wherein when the vehicle is judged by said judging means as being in the normal forward driving mode, said thrust pressure setting means corresponding to said clutch control pressure lowers said high pulley thrust control pressure.

9. The control apparatus as set forth in claim 8 wherein:

said power transmission mechanism has a forward drive train and a reverse drive train provided in parallel; said forward drive train transmitting power from said input shaft to said output shaft such that said output shaft rotates in a forward direction, and said reverse drive train transmitting power from said input shaft to said output shaft such that said output shaft rotates in the reverse direction; and further including:

a reverse drive actuator for allowing the power transmission through said reverse drive train, said reverse drive actuator being actuated by a supply of a hydraulic pressure; and open/close switching means for opening and closing a line through which the pressure actuating said reverse drive actuator is supplied;

wherein when said clutch control pressure is equal to or higher than said predetermined value, said open/close switching means closes said line supplying the pressure to said reverse drive actuator and supplies a lowering pressure for lowering said high pulley thrust control pressure to said thrust pressure setting means.

10. The control apparatus as set forth in claim 9 wherein:

said open/close switching means comprises an open/close switching valve which is actuated by said clutch control pressure; and said open/close switching valve closes said line supplying the pressure to said reverse drive actuator and delivers said lowering pressure to said thrust pressure setting means when said clutch control pressure rises above the pressure required for said starting clutch to transmit a maximum torque from the input shaft.

11. The control apparatus as set forth in claim 10 wherein said lowering pressure is said clutch control pressure.

12. The control apparatus as set forth in claim 6 wherein said normal forward driving mode includes a driving condition which does not require a speed change or a rapid speed change.

13. The control apparatus as set forth in claim 6, wherein said predetermined value is set above the clutch pressure required for said starting clutch to transmit a maximum torque from the input shaft.

* * * * *

UNITED STATES PATENT AND TRADEMARK OFFICE
CERTIFICATE OF CORRECTION

PATENT NO. : 5,674,150
DATED : October 7, 1997
INVENTOR(S) : Morishita et al.

It is certified that error appears in the above-identified patent and that said Letters Patent is hereby corrected as shown below:

Claim 2,
Line 11, before "provided" delete "is".
Line 19, delete "starling" and insert -- starting --.

Claim 3,
Line 12, delete "wherein".

Signed and Sealed this

Nineteenth Day of March, 2002

Attest:

*Attesting Officer*

JAMES E. ROGAN
*Director of the United States Patent and Trademark Office*